(12) United States Patent
Mizutani (10) Patent No.: US 6,789,983 B2
(45) Date of Patent: Sep. 14, 2004

(54) ROTARY CUTTING TOOL AND THROW-AWAY TIP

(75) Inventor: Masanori Mizutani, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 48 days.

(21) Appl. No.: 10/111,397

(22) PCT Filed: Aug. 27, 2001

(86) PCT No.: PCT/JP01/07336

§ 371 (c)(1),
(2), (4) Date: May 3, 2002

(87) PCT Pub. No.: WO02/32605

PCT Pub. Date: Apr. 25, 2002

(65) Prior Publication Data

US 2002/0154957 A1 Oct. 24, 2002

(30) Foreign Application Priority Data

Oct. 10, 2000 (JP) ........................................ 2000-308795

(51) Int. Cl.⁷ ................................................ B23C 5/02
(52) U.S. Cl. .............................. 407/46; 407/47; 407/49
(58) Field of Search .............................. 407/42, 46, 49, 407/40, 47, 48, 101; 408/713

(56) References Cited

U.S. PATENT DOCUMENTS

| | | | |
|---|---|---|---|
| 4,580,929 A | | 4/1986 | Gehri |
| 4,995,767 A | | 2/1991 | Segal |
| 5,469,902 A | * | 11/1995 | Sharp et al. ................ 144/241 |
| 5,716,167 A | | 2/1998 | Siddle et al. |
| 5,857,506 A | * | 1/1999 | Paolone ..................... 144/230 |

FOREIGN PATENT DOCUMENTS

| | | |
|---|---|---|
| JP | 5-138426 | 6/1993 |
| JP | 6-39318 | 5/1994 |
| JP | 8-25126 | 1/1996 |
| JP | 10 508259 | 8/1998 |
| JP | 10263917 | 10/1998 |
| JP | 11-10435 | 1/1999 |
| JP | 2000-15503 | 1/2000 |

OTHER PUBLICATIONS

English Language Abstract of JP 5–138426.
English Language Abstract of JP 2000–15503.
English Language Abstract of JP 11–10435.
English Language Abstract of JP 8–25126.
English Language Abstracts of JP 6–39318.
English Language Abstract of JP 10–263917.

* cited by examiner

Primary Examiner—Willmon Fridie, Jr.
(74) Attorney, Agent, or Firm—Greenblum & Bernstein, P.L.C.

(57) ABSTRACT

A clamping mechanism that prevents the shift and scattering of the cutting inserts due to centrifugal force and that prevents the generation of unwanted distortion and strain in the rotary tool body. The rotary cutting tool of the present invention has a plurality of cutting inserts 22 along the periphery of a cylindrical tool body 21. The cutting inserts 22 are securely attached to cartridges 23 by using attaching screws 24. The cartridges 23 are then attached to the tool body. Each of the cutting inserts is clamped such that a set screw 26 screwed into the corresponding slanted threaded hole 28 formed in the tool body 21 presses the cutting insert 22 at its surface portion located on the other side of the attaching screw 24 with respect to the cutting edge of the cutting insert 22.

20 Claims, 7 Drawing Sheets

F-F section

(A)
E-E side

FIG. 2 (B)

(B)
F-F section

(B)
G-G side

(B)
I-I side

FIG. 5 (C)

(C)
H-H section

Prior Art

FIG. 8

Prior Art

ROTARY CUTTING TOOL AND THROW-AWAY TIP

TECHNICAL FIELD

The present invention relates to a mechanism for clamping a cutting insert used in a rotary cutting tool such as a face milling cutter. It also relates to a cutting insert to be clamped by the mechanism.

BACKGROUND ART

Researchers and engineers have been improving the cutting method for soft materials such as aluminum alloys in order to increase machining precision and productivity. In particular, in the field of the milling of soft aluminum alloys, the cutting efficiency has increased notably by employing high-speed rotation in comparison with the cutting of ordinary steel materials. In other words, cutting tools have been rotated at increasingly high speeds. Cutting tools for milling aluminum alloys usually use cemented-carbide inserts and coated inserts. However, the use of polycrystalline-diamond (PCD) inserts has been increasing in recent years. PCD inserts can prevent the aluminum component from welding onto the cutting edge, improving the finishing precision. Consequently, PCD inserts can have sufficient resistance to high-speed cutting.

When a cutting tool is operated at high rotational speeds to increase efficiency, considerable centrifugal force is applied to the peripheral portion of the cutting tool. The force may scatter cutting inserts and insert-holding parts to the outside, and become a serious safety hazard. Therefore, it is necessary to solve this potential problem prior to the application of high-speed operation. A number of proposals to prevent scattering have been disclosed thus far.

Figure 7:
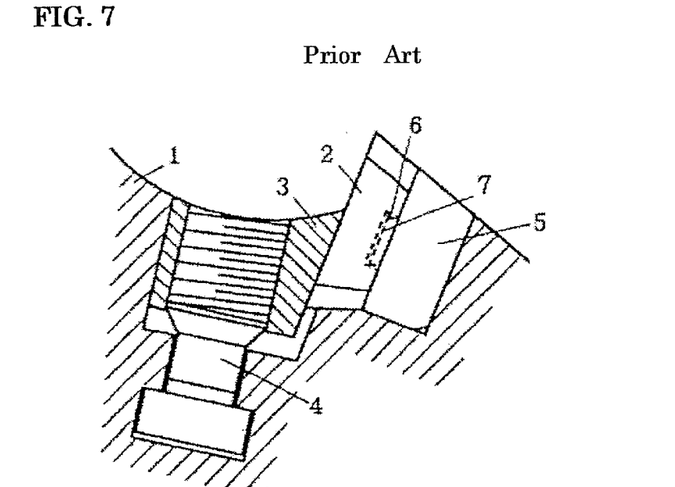
FIG. 7 is a view showing a conventional clamping mechanism.

FIG. 7 is an example of the prior art for securing a cutting insert (hereinafter referred to as insert) with a wedging member. This example has been disclosed by the published Japanese patent application Tokukaihei 5-138426. In FIG. 7, the individual members are denoted by the following numbers: 1: a tool body; 2: an insert; 3: a wedging member; 4: a clamping bolt; 5: a holding member; 6: a recess; and 7: a projection. The insert 2 is held by fitting the projection 7 provided on the front face of the holding member 5 into the recess 6 provided on the rear face of the insert 2. This patent application has also disclosed another structure in which the insert 2 is directly held by fitting the projection 7 provided directly on the tool body into the recess 6 without using the holding member 5.

The wedging member 3 is held such that the turning of the clamping bolt 4 can move the wedging member 3 back and forth in the radial direction of the tool body 1. Thus, one side of the wedging member 3 presses the front face of the insert 2 to prevent it from springing out. When loosened, the wedging member 3 and the clamping bolt 4 can move in the axial direction of the tool body 1, facilitating the attaching and detaching of the insert 2.

Another published Japanese patent application, Tokukai 2000-15503, has disclosed another method for preventing the spring-out of an insert by using a wedging member. In this application, the fitting of the insert is performed by replacing the recess of the insert shown in FIG. 7 with a through hole and concurrently replacing the projection of the holding member with a pinning member. Yet another published Japanese patent application, Tokukaihei 11-10435, has disclosed another method. This method not only prevents the spring-out of an insert by pressing the slanted face of the insert or a holding member with a wedging member but also enables the draw-out of the insert or the holding member in the axial direction of the tool body. This structure allows easy attachment and detachment of the insert or the holding member merely by slightly loosening the wedging member.

In the above description, when an insert is attached by the fitting of the recess and the projection or by the fitting of the through hole and the pin, a clearance must be provided at the fitting portion for enabling easy attachment and detachment of the insert. This clearance, however, allows the insert to shift by the amount of the clearance when centrifugal force is applied during high-speed rotation. This shift disturbs the balanced amounts of the cutting among the inserts, causing uneven thicknesses of the metal chips produced by the cutting operation. As a result, an excessive load is applied to the shifted insert. This load may cause a fracture and subsequent spring-out of the insert.

Although the fixing of the insert with the wedging member can prevent the shift and spring-out of the insert, the centrifugal force may cause the wedging member itself to spring out because the wedging member is attached without restriction in the direction of the centrifugal force. Furthermore, the use of the wedging member is unavoidably accompanied by the reduction in the stiffness of the tool body. The intense tightening force broadens the groove that houses the insert and wedging member, generating distortion and strain in the tool body. When centrifugal force is applied due to high-speed rotation of the tool, the distortion and strain will be released, increasing the risk of the spring-out of the wedging member.

Figure 8:
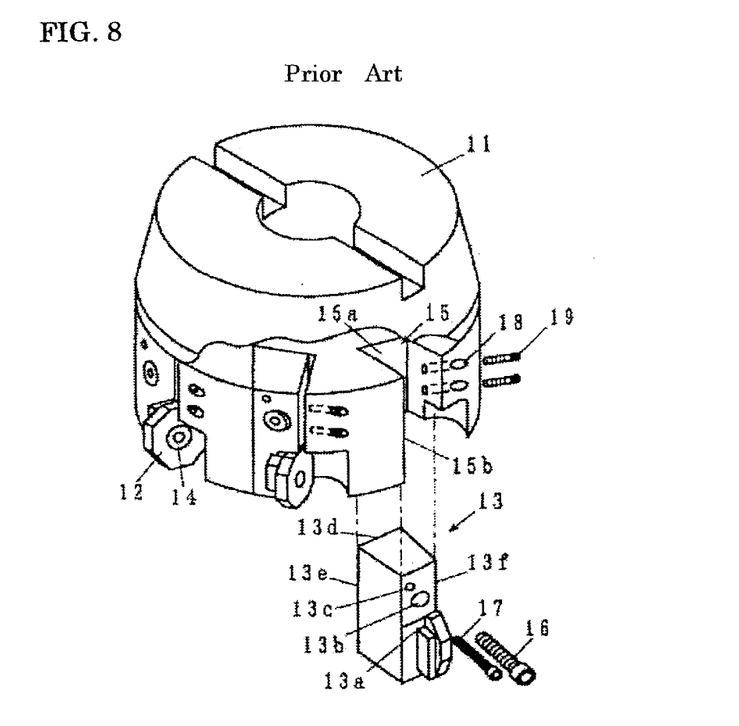
FIG. 8 is a view showing another conventional clamping mechanism.

Yet another published Japanese patent application, Tokuhyouhei 10-508259, has disclosed another method shown in FIG. 8. This method attaches an insert without using a recess-projection fit or a pin fit and yet without using a wedging member. In FIG. 8, the individual members are denoted by the following numbers: 11: a tool body; 12: an insert; 13: a cartridge (holding member); 14: an insert-attaching screw; 15: a cartridge-receiving recess; 16: a holding screw; 17: an adjusting screw; 18: a threaded hole; and 19: a set screw.

As shown in FIG. 8, the insert 12 is attached to the tool body 11 through the cartridge 13. The insert 12 is positioned in a pocket 13a of the cartridge without being turned and is fixed by the insert-attaching screw 14. The cartridge 13 is fixed in the cartridge-receiving recess 15 of the tool body 11 with the holding screw 16 and the set screw 19.

A cartridge hole 13b into which the holding screw 16 is inserted has a diameter slightly larger than that of the holding screw 16 so that the position of the cartridge 13 can be adjusted upward and downward and leftward and rightward. The upward and downward adjustment of the cartridge 13 is performed by inserting the adjusting screw 17 into an inclined hole 13c provided at an upper portion of the cartridge 13. This adjustment controls the amount of the front protrusion of the insert 12.

The cartridge-receiving recess 15 has an inner wall 15a that is parallel to its position's tangent on the peripheral circle of the tool body 11 and a side wall 15b that is slanted to the normal direction of the inner wall 15a by an angle of about 10 degrees. The cartridge 13 to be mated with these walls has a back face 13d and a side face 13e between which the same angle as above is provided. The threaded hole 18 is provided from the peripheral surface of the tool body 11 to the cartridge-receiving recess 15. The set screw 19 is screwed into the threaded hole 18 to press the other side face 13f of the cartridge 13, so that the back face 13d and the side face 13e of the cartridge 13 are strongly mated with the inner wall 15a and the side wall 15b of the recess 15, respectively. Thus, the cartridge 13 is fixed.

The side face 13f of the cartridge 13 has an indentation (not shown in FIG. 8) into which the end of the set screw 19 is fitted. The spring-out of the cartridge 13 due to the centrifugal force is prevented by fitting the set screw 19 into the indentation and by pressing the side face 13e of the cartridge against the side wall 15b having an acute angle to the inner wall 15a.

Unlike the structure shown in FIG. 7, the one shown in FIG. 8 is designed to attach an insert without using a recess-projection fit or a pin fit and yet without using a wedging member. This design therefore can prevent the shift of the insert due to the centrifugal force caused by high-speed rotation and the distortion and strain of the tool body due to the tightening of the wedging member. However, the insert 12 is simply attached to the cartridge 13 with the insert-attaching screw 14. Consequently, the clamping force is weaker than that of a structure in which a wedging member is used. As a result, the insert-attaching screw 14 may fracture during high-speed rotation that applies considerable centrifugal force to the insert-attaching mechanism. Therefore, the structure shown in FIG. 8 alone cannot prevent the scattering of the inserts 12, though it can prevent the spring-out of the cartridges 13.

DISCLOSURE OF THE INVENTION

Under the above-described circumstances, the present invention offers a clamping mechanism that prevents the shift and scattering of inserts due to centrifugal force and that prevents the generation of unwanted distortion and strain in the rotary tool body.

The rotary cutting tool of the present invention has a plurality of inserts along the periphery of a cylindrical tool body. The inserts are securely attached to cartridges by using attaching screws The cartridges are then attached to the tool body. Each of the inserts is clamped such that a set screw screwed into the corresponding slanted threaded hole formed in the tool body presses the insert at its surface portion located on the other side of the attaching screw with respect to the cutting edge of the insert.

BRIEF DESCRIPTION OF THE DRAWINGS

In the drawings:

FIGS. 2(a–b) is a view showing a partial enlargement and a partial cross section of the cutter shown in FIG. 1;

FIGS. 3(a–b) is a view showing an insert to be used in the present invention;

FIGS. 4(a–b) is a view showing another insert to be used in the present invention;

FIGS. 5(a–c) is a view showing a cartridge to be used in the present invention;

BEST MODE FOR CARRYING OUT THE INVENTION

Figure 1:
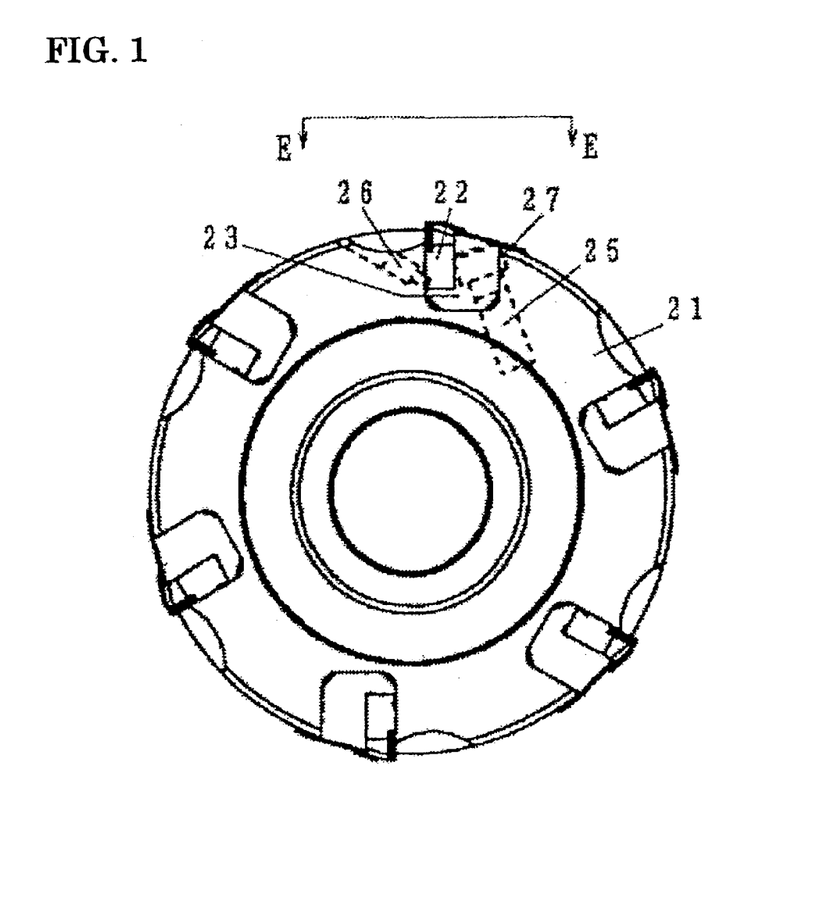
FIG. 1 is a view showing the face milling cutter of the present invention.
Figure 2:
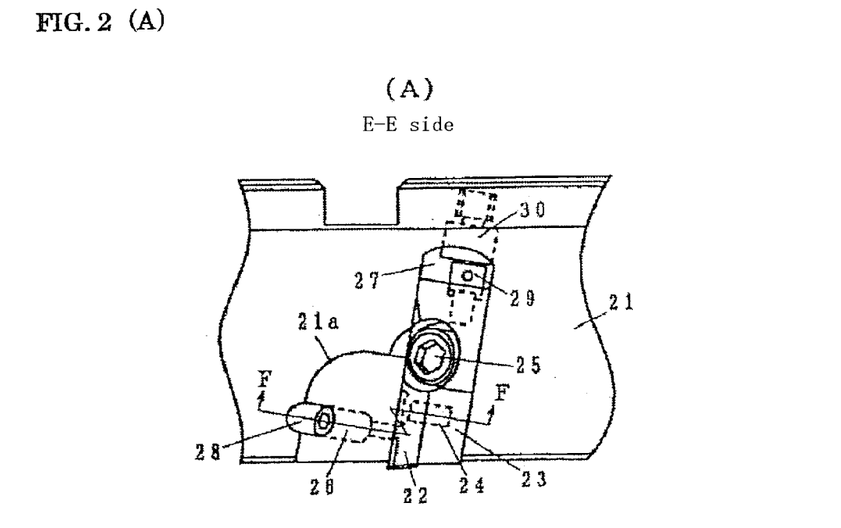

An embodiment of the present invention is explained below by referring to the face milling cutter shown in FIGS. 1 and 2. FIG. 1 shows a front side of the face milling cutter. FIG. 2(A) shows an enlarged side view of the cutter viewed from the line E—E shown in FIG. 1. FIG. 2(B) shows a cross section along the line F—F shown in FIG. 2(A). In FIGS. 1 and 2, the individual members are denoted by the following numbers: 21: a tool body 22: an insert 23: a cartridge 24: an insert-attaching screw 25: a holding screw 26: a set screw 27: a cartridge-receiving recess 28: a slanted threaded hole 29: an adjusting screw and 30: a positioning piece.

The tool body 21 has a generally cylindrical form and is made of an alloy such as an aluminum alloy or a steel alloy. A plurality of cartridge-receiving recesses 27 are provided along the periphery of the tool body 21 to securely hold a plurality of inserts 22. As shown in a detailed illustration of FIG. 2, the insert 22 is fixed to the cartridge 23 with the insert-attaching screw 24, and the cartridge 23 is held in the cartridge-receiving recess 27 through the use of the holding screw 25. The position of the cartridge 23 is adjusted by turning the adjusting screw 29 and finalized by bringing the head of the adjusting screw 29 into contact with the positioning piece 30.

The insert 22 held by the tool body 21 through the cartridge 23 is fixed to the tool body by pressing the face 22a of the insert with the set screw 26 in order to press the cartridge 23 against the walls of the cartridge-receiving recess 27. The set screw 26 is shaped so that it does not protrude from the slanted threaded hole 28 formed in the tool body's concave portion 21a provided at the side of the face 22a of the insert.

The inserting angle θ of the set screw 26 is determined such that the position of the slanted threaded hole 28 has no adverse effect on the expulsion of the metal chips produced by a cutting operation and that the angle produces effective force to prevent the shift and spring-out of the insert 22 due to centrifugal force. It is desirable that the angle θ be about 10 to 45 degrees with respect to the tangent at the point where the insert is attached to the tool body.

Figure 3:
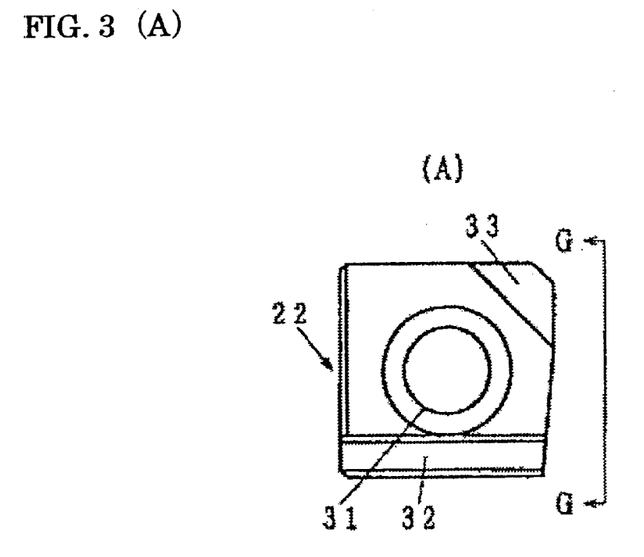

A rectangular insert shown in FIG. 3 may be used as the insert 22. FIG. 3(A) shows a plan view of the insert, and FIG. 3(B) shows a side view. The insert 22 comprises a base material made of, for example, cemented carbide containing WC and Co and a cutting-edge portion 33 made of PCD or a cubic born nitride sintered body (CBN) soldered to the base material. The insert 22 is provided at its center with a screw-inserting through hole 31 for securely attaching the insert to the cartridge 23.

In the present invention, the insert 22 is provided on its surface with a clamping groove 32 for fixing the insert by using the set screw 26 as explained above by referring to FIG. 2. The clamping groove 32 is provided parallel to at least one of the rectangle's two opposite sides, which are away from the cutting-edge portion 33. It is desirable that the clamping groove 32 have a cross section of a V shape with a proper interior angle including 90 degrees and that, of the two walls of the groove, a clamping wall 32a against which the end of the set screw 26 is pressed be perpendicular to the axis of the set screw 26.

Figure 4:
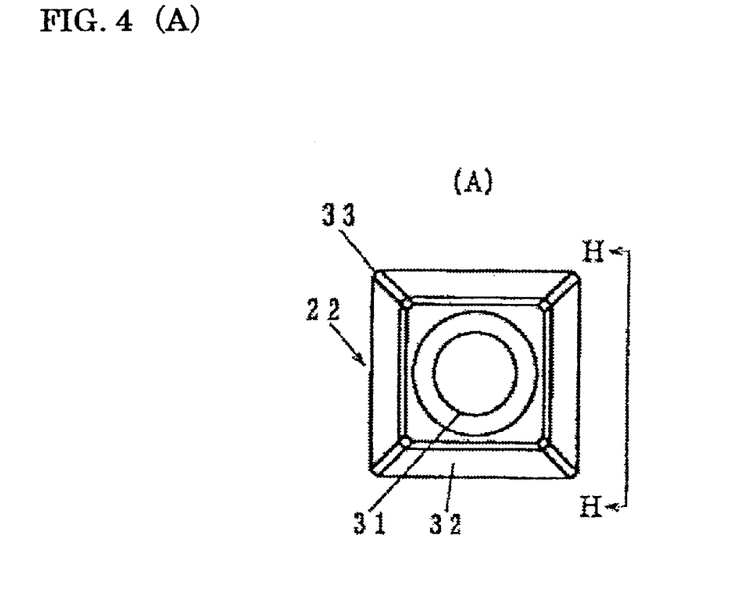

FIG. 4 shows another example of an insert having a different shape. As with FIG. 3, FIG. 4(A) shows a plan view, and FIG. 4(B) shows a side view. This insert has a cutting-edge portion 33 at each corner of the quadrangle so that each cutting edge can be used one after another by changing the attaching direction. This insert has a clamping groove 32 at each side of the quadrangle so that it does not adversely affect the cutting operation of the cutting-edge portion 33. The clamping groove 32 may have the same cross-sectional shape as in FIG. 3.

The clamping groove 32 can be formed concurrently when the insert 22 is formed by pressing. In the case of the insert shown in FIG. 3, it can also be formed by machining after the insert is formed. Because the clamping groove 32 is formed throughout one side of the quadrangular periphery of an insert, the insert can be used with a tool body having a different position of its set screw, depending on the type of tool body. If the clamping location of the set screw is fixed, the clamping groove 32 may be formed as a short groove at a specified location or may be formed as a circular indentation at the location against which the end of the set screw is pressed. In addition, the shape of the insert 22 is not limited to a quadrangle; any polygon including a triangle and a pentagon may be used.

Figure 5:
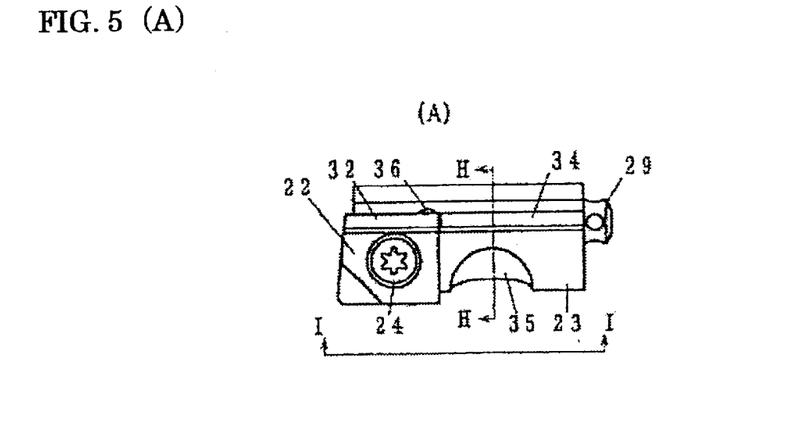

FIG. 5 shows a cartridge 23 for securely holding the insert 22. FIG. 5(A) is a view showing the face of the attached insert. FIG. 5(B) is a side view viewed from the line I—I shown in FIG. 5(A). FIG. 5(C) is a cross-sectional view along the line H—H shown in FIG. 5(A). The cartridge 23 has the shape of a rectangular solid and is made of a material such as cemented carbide. A recess 36 to which the insert 22 is attached is formed at the front-side end portion of one side of the cartridge. The insert 22 is securely attached into the recess 36 by using a single attaching screw. The adjusting screw 29 for position adjustment is screwed into the back side of the cartridge 23 in order to perform the fine adjustment of the amount of the protrusion of the insert 22 from the tool body.

An attaching hole 35 is provided in the vicinity of the center portion of the cartridge 23 to allow the insertion of a holding screw that attaches the cartridge 23 to the tool body. The attaching hole 35 has a slightly large clearance in the direction of position adjustment for enabling the position adjustment with the adjusting screw 29. The surface to which the insert 22 is attached is provided with a linear groove 34 that has the same cross section as that of the clamping groove 32 illustrated in FIG. 3 and that is aligned with the clamping groove 32.

Figure 6:
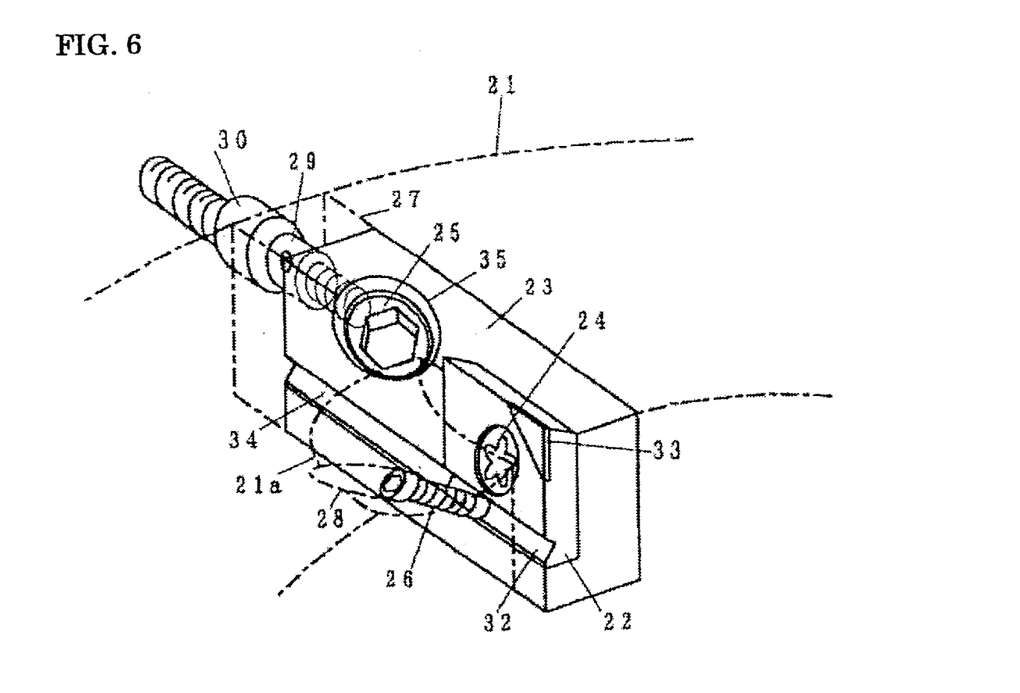
FIG. 6 is a perspective view showing the clamping mechanism of the present invention.

FIG. 6 is a perspective view showing the insert 22 fixed by using the above-described cartridge 23. The mechanism and function for fixing the insert 22 is explained below by referring to FIG. 6. As illustrated in FIG. 5, the insert 22 is fixed to the cartridge 23 with the attaching screw 24 in advance. The adjusting screw 29 is also fixed at the predetermined screwing position. The cartridge 23 having the insert 22 and the adjusting screw 29 is inserted into the cartridge-receiving recess 27 in the tool body 21 and is lightly tightened with the holding screw 25. The positioning piece 30 is fixed at the innermost part of the cartridge-receiving recess 27 at the predetermined position. The cartridge 23 is positioned at the place where the head of the adjusting screw 29 inserted into the back side of the cartridge is in contact with the positioning piece 30.

Subsequently, the adjusting screw 29 is turned to adjust the position of the cutting-edge portion 33 on the insert 22. This adjustment is effected by the presence of the clearance provided at the attaching hole 35 in the cartridge 23. Thus, the position of the cartridge 23 is finally determined. Then, the holding screw 25 is tightly screwed to complete the attaching of the cartridge 23. If the tool body 21 rotates at moderate speeds, the cutting under these conditions will pose no particular problem. However, when the tool body rotates at high speeds, considerable centrifugal force is applied to the insert 22 and the cartridge 23. As a result, slight looseness in screws and accompanying shifts of inserts may disturb the balance of the cutting, leading to the fracture and spring-out of inserts.

In the present invention, the set screw 26 directly presses the insert 22 to completely prevent the shift and spring-out of the insert 22 and the cartridge 23. The set screw 26 is screwed into the slanted threaded hole 28 and presses the insert at its surface portion located on the other side of the attaching screw 24 with respect to the cutting-edge portion 33 of the insert. This structure prevents the rising and shift of the insert during a cutting operation. The set screw 26 may be relatively thin because only compressive loads, although large in magnitude, are applied to the screw.

The use of a thin screw as the set screw 26 enables the formation of the threaded hole 28 that crosses the concave portion 21a provided on the tool body 21 in order to expel metal chips produced during a cutting operation. Consequently, the insert 22 can be pressed at a highly effective angle for preventing the shift and spring-out. It is possible to design a structure in which the set screw 26 is attached without protruding from the surface of the concave portion 21a. This design allows free discharge of the metal chips.

The clamping groove 32 provided on the surface of the insert 22 can be designed such that the inclined wall against which the end of the set screw 26 is pressed is perpendicular to the axis of the set screw 26. According to this design, pressing force is exerted to the insert 22 in the direction opposite to the direction in which the insert 22 springs out due to centrifugal force. Consequently, the shift and spring-out of the insert can be completely prevented. Furthermore, the cartridge 23 to which the insert 22 is fixed can also be prevented from shifting and springing out.

As illustrated in FIG. 5, the cartridge 23 can be provided with a groove 34 that has the same cross section as that of the clamping groove 32 provided on the insert 22 and that is aligned with the clamping groove 32. When the groove 34 is provided, the cartridge 23 can be quickly moved along the recess without completely retracting the set screw 26 from the clamping groove 34 for changing the insert 22, because the end portion of the set screw 26 can pass through the groove 34 when the screw is slightly loosened. In other words, the groove 34 facilitates the quick attaching and detaching of the cartridge 23.

Industrial Applicability

As explained above, the rotary cutting tool of the present invention has no wedging member. Consequently, the tool body can be prevented from being distorted and strained and therefore can be formed with an aluminum alloy, which is relatively light and low-cost. Because inserts are held without using a fit in this structure, the inserts can be not only completely prevented from shifting but also prevented from scattering. Moreover, because inserts are directly clamped in this structure, the prevention of the spring-out of the cartridges can be effected in addition to the prevention of the shift and spring-out of the inserts.

What is claimed is:

1. A rotary cutting tool comprising:
    (a) a cylindrical tool body having a plurality of slanted threaded holes along its periphery;
    (b) a plurality of cartridges; and
    (c) a plurality of cutting inserts each of which:
        (c1) is fixed to one of the cartridges by using an attaching screw;
        (c2) is attached to the periphery of the tool body through the cartridge; and
        (c3) is clamped such that a set screw screwed into the corresponding slanted threaded hole presses the cutting insert at its surface portion located on the other side of the attaching screw with respect to the cutting edge of the cutting insert, wherein the cutting insert to be clamped by the set screw is provided on its surface with a clamping groove against which the set screw is pressed.

2. A rotary cutting tool as defined in claim 1, wherein the slanting angle of the slanted threaded holes is 10 to 45 degrees with respect to the tangent at the point where the cutting insert is attached.

3. A rotary cutting tool as defined in claim 1, wherein the clamping groove has an inclined wall against which the set screw is pressed perpendicularly.

4. A rotary cutting tool as defined in claim 1, wherein the clamping groove on the surface of the cutting insert is formed parallel to a side face of the cutting insert.

5. A rotary cutting tool as defined in claim 4, wherein the cartridge is provided with a groove that:
(a) has the same cross section as that of the clamping groove; and
(b) is aligned with the clamping groove.

6. A cutting insert that:
(a) is to be used in a rotary cutting tool as defined in claim 1; and
(b) has the clamping groove.

7. A rotary cutting tool as defined in claim 2, wherein the clamping groove has an inclined wall against which the set screw is pressed perpendicularly.

8. A rotary cutting tool as defined in claim 3, wherein the clamping groove on the surface of the cutting insert is formed parallel to a side face of the cutting insert.

9. A rotary cutting tool as defined in claim 2, wherein the clamping groove on the surface of the cutting insert is formed parallel to a side face of the cutting insert.

10. A rotary cutting tool as defined in claim 7, wherein the clamping groove on the surface of the cutting insert is formed parallel to a side face of the cutting insert.

11. A rotary cutting tool as defined in claim 8, wherein the cartridge is provided with a groove that:
(a) has the same cross section as that of the clamping groove; and
(b) is aligned with the clamping groove.

12. A rotary cutting tool as defined in claim 9, wherein the cartridge is provided with a groove that:
(a) has the same cross section as that of the clamping groove; and
(b) is aligned with the clamping groove.

13. A rotary cutting tool as defined in claim 10, wherein the cartridge is provided with a groove that:
(a) has the same cross section as that of the clamping groove; and
(b) is aligned with the clamping groove.

14. A cuffing insert that:
(a) is to be used in a rotary cutting tool as defined in claim 3; and
(b) has the clamping groove.

15. A cutting insert that:
(a) is to be used in a rotary cutting tool as defined in claim 4; and
(b) has the clamping groove.

16. A cutting insert that:
(a) is to be used in a rotary cutting tool as defined in claim 2; and
(b) has the clamping groove.

17. A cutting insert that:
(a) is to be used in a rotary cutting tool as defined in claim 7; and
(b) has the clamping groove.

18. A cutting insert that:
(a) is to be used in a rotary cutting tool as defined in claim 8; and
(b) has the clamping groove.

19. A cutting insert that:
(a) is to be used in a rotary cutting tool as defined in claim 9; and
(b) has the clamping groove.

20. A cutting insert that:
(a) is to be used in rotary cutting tool as defined in claim 10; and
(b) has the clamping groove.

* * * * *